US011068429B2

(12) United States Patent
Brando et al.

(10) Patent No.: US 11,068,429 B2
(45) Date of Patent: Jul. 20, 2021

(54) OSCILLATION REDUCTION UNIT FOR A BUS SYSTEM AND METHOD FOR REDUCING AN OSCILLATION TENDENCY WHEN TRANSITIONING BETWEEN DIFFERENT BIT STATES

(71) Applicant: Robert Bosch GmbH, Stuttgart (DE)

(72) Inventors: Cyrille Brando, Sunnyvale, CA (US); Axel Pannwitz, Radebeul (DE); Steffen Walker, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/636,988

(22) PCT Filed: Aug. 1, 2018

(86) PCT No.: PCT/EP2018/070911
§ 371 (c)(1),
(2) Date: Feb. 6, 2020

(87) PCT Pub. No.: WO2019/030082
PCT Pub. Date: Feb. 14, 2019

(65) Prior Publication Data
US 2020/0364171 A1 Nov. 19, 2020

(30) Foreign Application Priority Data
Aug. 8, 2017 (DE) ...................... 10 2017 213 835.1

(51) Int. Cl.
*G06F 13/40* (2006.01)
(52) U.S. Cl.
CPC ...... *G06F 13/4022* (2013.01); *G06F 13/4068* (2013.01); *G06F 2213/40* (2013.01)
(58) Field of Classification Search
CPC .......................... G06F 13/4022; G06F 13/4068
See application file for complete search history.

(56) References Cited

U.S. PATENT DOCUMENTS

2006/0091915 A1* 5/2006 Pauletti ................. H04L 25/085
327/108
2009/0279617 A1* 11/2009 Mori .................. H04L 25/0278
375/257

(Continued)

FOREIGN PATENT DOCUMENTS

| CN | 101540627 A | 9/2009 |
| DE | 102013222786 A1 | 5/2015 |

(Continued)

OTHER PUBLICATIONS

International Search Report for PCT/EP2018/070911, dated Oct. 2, 2018.

*Primary Examiner* — Tim T Vo
*Assistant Examiner* — Phong H Dang
(74) *Attorney, Agent, or Firm* — Norton Rose Fulbright US LLP; Gerard Messina

(57) ABSTRACT

An oscillation reduction unit for a bus system. The oscillation reduction unit has two transistors, which are situated anti-serially between a first bus wire of a bus of the bus system and a second bus wire of the bus, in which bus system an exclusive, collision-free access of a user station to the bus of the bus system is at least temporarily ensured, and a time control block for switching the two transistors and designed to switch on the two transistors while a signal on the first and/or second bus wire and/or a transmission signal, from which the signals on the first and/or second bus wire are generated, changes from a dominant state to a recessive state, and designed to switch off the two transistors if the signal on the first and/or second bus wire and/or the transmission signal is/are switched into the recessive state.

16 Claims, 8 Drawing Sheets

(56) References Cited

U.S. PATENT DOCUMENTS

| | | | |
|---|---|---|---|
| 2012/0293230 A1 | 11/2012 | Mori et al. | |
| 2015/0082123 A1* | 3/2015 | Hartwich | G06F 11/073 |
| | | | 714/768 |
| 2015/0169488 A1* | 6/2015 | Metzner | G06F 13/4022 |
| | | | 710/316 |
| 2016/0036604 A1* | 2/2016 | Mori | H04L 25/029 |
| | | | 375/296 |
| 2016/0094362 A1* | 3/2016 | Brennan | H03K 3/012 |
| | | | 327/109 |
| 2016/0269200 A1* | 9/2016 | Pannwitz | H04L 12/40 |
| 2017/0063571 A1* | 3/2017 | Hehemann | H04L 25/028 |

FOREIGN PATENT DOCUMENTS

| | | |
|---|---|---|
| DE | 102014204048 A1 | 9/2015 |
| DE | 102014209694 A1 | 11/2015 |
| DE | 102014215469 A1 | 2/2016 |
| JP | 2012049784 A | 3/2012 |
| JP | 2012244220 A | 12/2012 |

* cited by examiner

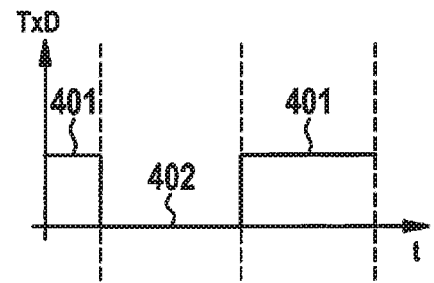
Fig. 3B
(conventional)
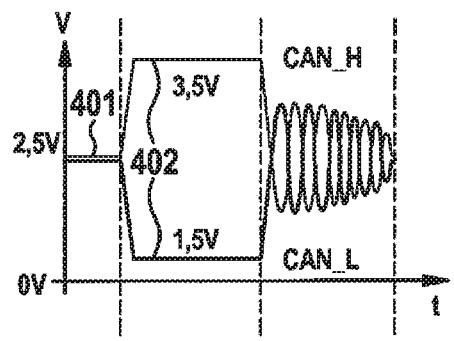
Fig. 4B
(conventional)
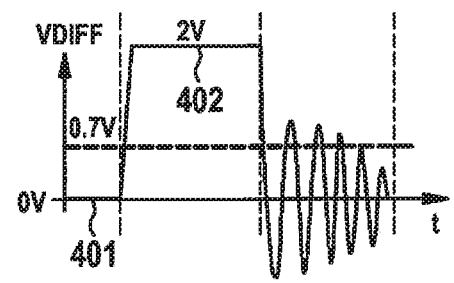
Fig. 5B
(conventional)

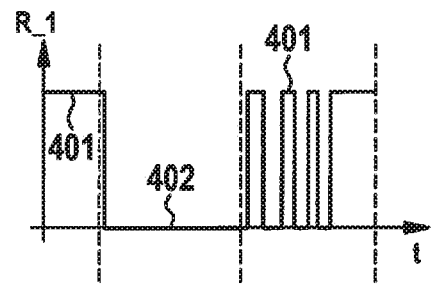
Fig. 6B
(conventional)
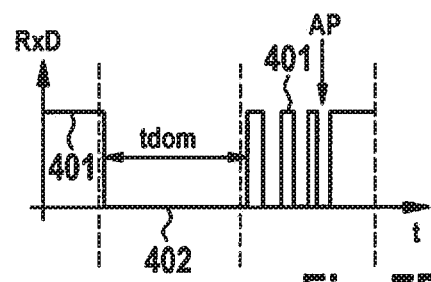
Fig. 7B
(conventional)

OSCILLATION REDUCTION UNIT FOR A BUS SYSTEM AND METHOD FOR REDUCING AN OSCILLATION TENDENCY WHEN TRANSITIONING BETWEEN DIFFERENT BIT STATES

The present invention relates to an oscillation reduction unit for a bus system and to a method for reducing an oscillation tendency when transitioning between different bit states, which may be used, for example, in a user station for a CAN bus system. The reduction of the oscillation tendency is achieved by a circuit, which is connected, for example, to a conventional CAN transmitting/receiving unit front end or to a conventional CAN FD transmitting/receiving unit front end.

BACKGROUND INFORMATION

During message transmission or data transmission in a bus system, pieces of information, which are contained in bytes or in bits of the messages or data, are represented by different bit states or voltage states. The different bit states result in different bus states during transmission of the message via a bus of the bus system. Various transmission protocols exist for message transmission or data transmission depending on the bus system.

In the CAN bus system, for example, messages are transmitted with the aid of the CAN protocol and/or CAN FD protocol, as is described in the Standard ISO-11898-1: 2015 as CAN protocol specification with CAN FD. The CAN bus system is widely used today for the communication between sensors and control units. The CAN bus system is often used in vehicles or in automation systems, etc. for a communication between the individual bus users.

In the case of the CAN/CAN FD communication, in particular, the transmitting/receiving units, which are also referred to as transceivers, must be able to drive the bus with low impedance in order to establish a dominant bus state or bit state as one of the two different bus states or bit states. In the recessive state as the other of the two different bus states on the other hand, the transmitting/receiving units are relatively high-impedance.

The transition from dominant to recessive is subject to an oscillation tendency, depending on the bus typology, length of the stubs or stub lines, position and number of the termination resistors. This is very disadvantageous in terms of the system design, because as a result, the bit time must be long enough until the oscillation is sufficiently attenuated. If the bit time is not long enough, the transmitting/receiving unit may erroneously detect a dominant in the recessive state. Maintaining the admissible error quota of the transmitting/receiving unit therefore necessitates a longer bit time, which results in an undesirable reduction of the transmission rate or transmission speed of the messages in the bus system.

SUMMARY

An object of the present invention is to provide an oscillation reduction unit for a bus system and a method for reducing an oscillation tendency when transitioning between different bit states, which solve the aforementioned problems. An oscillation reduction unit for a bus system and a method for reducing an oscillation tendency when transitioning between different bit states or voltage states, in particular, an oscillation tendency when transitioning from the dominant to the recessive state are, in particular, to be provided in a bus system.

The object may be achieved by an example oscillation reduction unit for a bus system in accordance with the present invention. The example oscillation reduction unit includes two transistors, which are situated anti-serially between a first bus wire of a bus of the bus system and a second bus wire of the bus, in which bus system an exclusive, collision-free access of a user station to the bus of the bus system is at least temporarily ensured, and a time control block for switching the two transistors, the time control block being designed to switch on the two transistors while a signal on the first and/or second bus wire and/or a transmission signal, from which the signals on the first and/or second bus wire are generated, switches from a dominant state to a recessive state, and the time control block being designed to switch off the two transistors if the signal on the first and/or second bus wire and/or the transmission signal is/are switched into the recessive state.

A reduction of the oscillation period or a so-calling ringing suppression when transitioning from dominant to recessive is possible with the described oscillation reduction unit, resulting in an increase in the bit rates, in particular, in the data range of a message. As a result, the transmission rate or transmission speed of the messages in the bus system increases.

A reduction of the oscillation period when transitioning between different bit states or voltage states, in particular in the CAN bus system, from dominant to recessive, also allows greater freedom in the designing of bus topologies and/or of terminations and/or of stubs and/or of the number of nodes or user stations of the bus system.

Moreover, an advantageous change of the spectrum during hard-wired emission is achieved by the described design of the oscillation reduction unit. It is possible namely to reduce the radiation of emissions in the critical frequency range, which is between one and three MHz, for example, which corresponds to the resonance frequency from common mode choke and parasitic capacitances. Instead, the radiation of emissions occurs in the non-critical frequency range as a result of the described oscillation reduction unit which, in the cited example, is at frequencies greater than 10 MHZ, and in which the choke is active.

In addition, a very symmetrical impedance of the two bus wires of the bus is created by the added driver. In the described oscillation reduction unit, the same elements are now connected to each bus wire. This enhances the interference resistance and emission of the oscillation reduction unit and of the components that are connected to the oscillation reduction unit.

The oscillation reduction unit is suitable for all communication systems, in which a bus state is actively driven such as, in particular, in a CAN bus system, a CAN HS bus system, a CAN FD bus system, etc. In a CAN HS bus system (HS=high speed), a data transmission rate of up to 500 kbits per second (500 kbps) is possible. In a CAN FD bus system, a data transmission rate of greater than 1 Mbit per second 1 (Mbps) is possible.

Advantageous additional embodiments of the oscillation reduction unit are described herein.

According to one example embodiment, the oscillation reduction unit may be designed to compensate for an inrush current to ground when switching on the transistors with a current from a terminal for a voltage supply. The transistors in this case are potentially PMOS high-voltage cascodes.

The oscillation reduction unit may include an additional transistor, the drain connection of which is connected to source terminals of the two transistors connected anti-serially between the bus wires. According to one exemplary embodiment, the oscillation reduction unit also has a power source for generating a bias voltage for the additional transistor, the additional transistor being structured according to the p-substrate bulk technology. According to another exemplary embodiment, the additional transistor is structured according to the SOI technology.

The previously described oscillation reduction unit may be part of a user station for the bus system, the user station also including a communication control unit for controlling a communication of the user station with at least one additional user station of the bus system, and a transmitting/receiving unit for transmitting messages to the bus of the bus system and for receiving messages from the bus.

It is possible that either the communication control unit or the transmitting/receiving unit includes a block, which is designed to detect a change of state of a signal received by the bus from the dominant bus state to the recessive bus state, the oscillation reduction unit being designed to switch the two transistors connected anti-serially between the bus wires on or off as a function of the detection result of the block.

According to one specific embodiment, it is possible that the oscillation reduction unit is activated only if the transmitting/receiving unit sends a message to the bus.

The previously described user station may be part of a bus system, which includes a bus and at least two user stations, which are connected via the bus to one another in such a way that they are able to communicate with one another. In this case, at least one of the user stations is a previously described user station.

The object may also be achieved by an example method for reducing an oscillation tendency when transitioning between different bit states in accordance with the present invention. The example method is carried out using an oscillation reduction unit for a bus system, in which an exclusive, collision-free access of a user station to a bus of the bus system is at least temporarily ensured, the oscillation reduction unit including two transistors, which are situated anti-serially between a first and second bus wire of a bus of the bus system, the method including the steps: switching on the two transistors using a time control block, while a signal on the first and/or second bus wire and/or a transmission signal from which the signals on the first and/or second bus wire are generated, switches from a dominant state to a recessive state, and switching off the two transistors using the time control block if the signal on the first and/or second bus wire and/or the transmission signal is switched into the recessive state.

The method offers the same advantages as previously cited with respect to the oscillation reduction unit.

BRIEF DESCRIPTION OF THE DRAWINGS

The present invention is described in greater detail below with reference to the figures and based on exemplary embodiments.

FIG. 3B shows a chronological profile of a transmission signal TxD in a conventional transmitting/receiving unit.

FIG. 4B shows a chronological profile of the bus signals CAN_H and CAN_L in the conventional transmitting/receiving unit.

FIG. 5B shows a chronological profile of the differential voltage VDIFF of the bus signals CAN_H and CAN_L in the conventional transmitting/receiving unit.

FIG. 6B shows a chronological profile of a receiver output in the conventional transmitting/receiving unit.

FIG. 7B shows a chronological profile of a receive signal RxD in a conventional transmitting/receiving unit.

In the figures, identical or functional identical elements are provided with the same reference numerals unless otherwise indicated.

DETAILED DESCRIPTION OF EXAMPLE EMBODIMENTS

Figure 1:
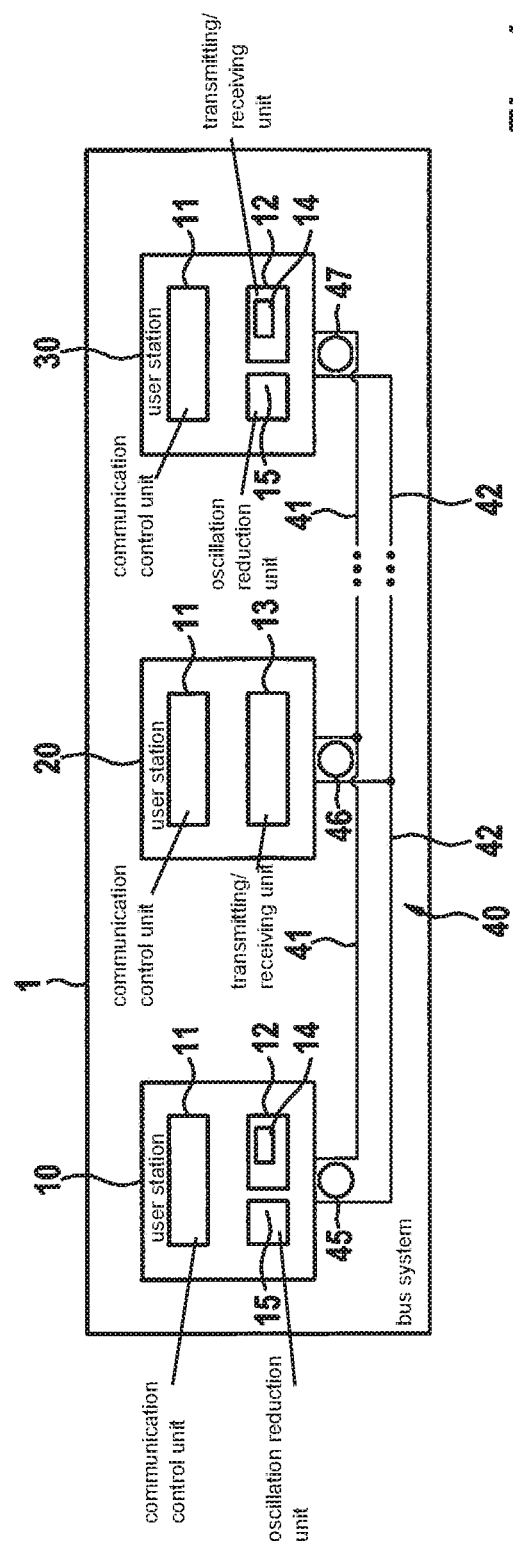
FIG. 1 shows a simplified block diagram of a bus system according to one first exemplary embodiment.

FIG. 1 shows a bus system 1, which may, for example, be at least in sections a CAN bus system, a CAN FD bus system, etc. Bus system 1 may be used in a vehicle, in particular, in a motor vehicle, in an aircraft, etc., or in the hospital, etc.

Bus system 1 in FIG. 1 has a plurality of user stations 10, 20, 30, each of which is connected to a bus 40 including a first bus wire 41 and a second bus wire 42. Bus wires 41, 42 may also be referred to as CAN_H and CAN_L and are used for coupling the dominant level in the transmitting state. Messages 45, 46, 47 in the form of signals may be transmitted via bus 40 between individual user stations 10, 20, 30. User stations 10, 20, 30 may, for example, be control units or display devices of a motor vehicle.

As shown in FIG. 1, user stations 10, 30 each have a communication control unit 11 and a transmitting/receiving unit 12. Transmitting/receiving units 12 each include an oscillation reduction unit 15. In contrast, user station 20 has one communication control unit 11 and one transmitting/receiving unit 13. Transmitting/receiving units 12 of user stations 10, 30 and transmitting/receiving unit 13 of user station 20 are each directly connected to bus 40, even though this is not depicted in FIG. 1.

Communication control unit 11 is used for controlling a communication of respective user stations 10, 20, 30 via bus 40 with another user station of user stations 10, 20, 30 connected to bus 40. Transmitting/receiving unit 12 is used to transmit messages 45, 47 in the form of signals and in the process utilizes oscillation reduction unit 15, as described later in greater detail. Communication control unit 11 may be designed, in particular, as a conventional CAN FD controller and/or CAN controller. Transmitting/receiving unit 13 may be designed, in particular, as a conventional CAN transceiver and/or CAN FD transceiver. Transmitting/receiving unit 13 may be designed, in particular, as a conventional CAN transceiver.

Figure 2:
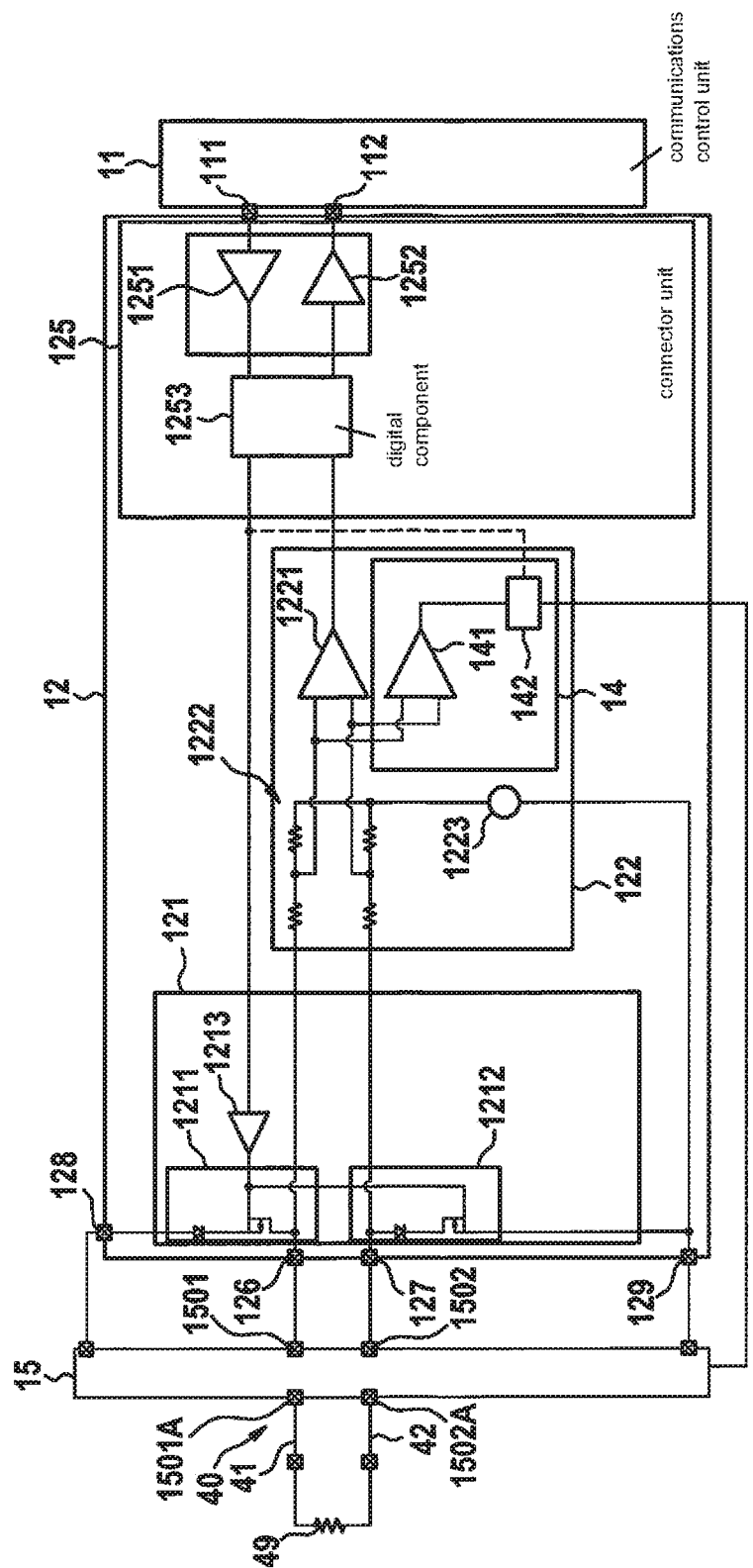
FIG. 2 shows an electrical circuit diagram of a transmitting/receiving unit including an oscillation reduction unit of the bus system according to the first exemplary embodiment.

FIG. 2 shows the basic structure of transmitting/receiving unit 12 including oscillation reduction unit 15. Transmitting/receiving unit 12 is connected with the aid of terminals 126, 127 to bus 40, more precisely, to its first bus wire 41 for CAN_H and to its second bus wire 42 for CAN_L. Oscillation reduction unit 15 is connected with terminals 1501, 1501A between terminals 41, 126 as well as with terminals 1502, 1502A between terminals 42, 127. Terminals 1501, 1501A may be designed as only one terminal. Terminals 1502, 1502A may be designed as only one terminal. The voltage supply, in particular, CAN supply, for first and second bus wires 41, 42 takes place via a terminal 128. The terminal to ground or CAN_GND is implemented via a terminal 129. First and second bus wires 41, 42 are terminated with a terminating resistor 49.

First and second bus wires 41, 42 are connected in transmitting/receiving unit 12 to a transmitter 121 and to a receiver 122. A connector unit 125 for driving signals via terminals 111, 112 to communication control unit 11 is connected both to transmitter 121 as well as to receiver 122.

To drive the signals of terminals 111, 112, connector unit 125 has a transmission signal driver 1251 for a transmission signal TxD, which is also referred to as a TxD signal and is received at terminal 111 by communication control unit 11. Connector unit 125 also has a receive signal driver 1252 for a receive signal RxD, which is also referred to as an RxD signal. Receive signal RxD has been received by bus wires 41, 42 with the aid of receiver 122 and is relayed via terminal 112 to communication control unit 11. Drivers 1251, 1252 are connected to transmitter 121 and receiver 122 via a digital component 1253. Digital component 1253 may carry out a monitoring of signals TxD, RxD.

According to FIG. 2, transmitter 121 has a conventional driver 1213 for output stages 1211, 1212 for the signals for first and second bus wires 41, 42.

Receiver 122 has a reception comparator 1221, the inputs of which are interconnected in a resistive, in particular, symmetrical, voltage divider 1222, more precisely, its center tap, and a bus bias voltage unit 1223. Bus bias voltage unit 1223 feeds resistive voltage divider 1222 at its one end with a predetermined bus bias voltage or a predetermined bus bias voltage potential. Resistive voltage divider 1222 is connected at its other end via terminals 126, 127 to first and second bus wires 41, 42.

Connector unit 14 includes a change of state detection block 141 and a time control block 142. During the operation of transmitting/receiving unit 12, change of state detection block 141 detects whether the state of signal CAN_H and of signal CAN_L on bus 40 changes from a first bus state 401 to a second bus state 402, which are described in greater detail with respect to FIG. 3A through FIG. 7B. Time control block 142 outputs activation signals to oscillation reduction unit 15 as a function of the detection result of change of state detection block 141, which are described in greater detail with respect to FIG. 8. Oscillation reduction unit 15 is optionally fed transmission signal TxD via a timing element, so that oscillation reduction unit 15 is activated from the TxD signal with the aid of the timing element.

FIG. 3A through FIG. 7A each show a chronological profile of signals in transmitting/receiving unit 12 according to the present exemplary embodiment. In this case, the signals are set according to FIG. 4A through FIG. 7A as a result of a transmission signal TxD shown in FIG. 3A.

Figure 3A:
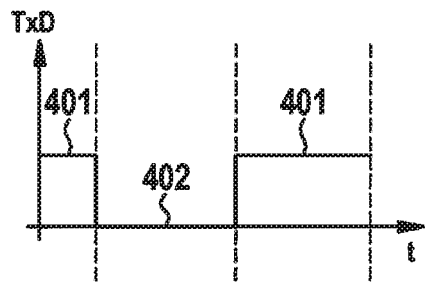
FIG. 3A shows a chronological profile of a transmission signal TxD in the transmitting/receiving unit including the oscillation reduction unit according to the first exemplary embodiment.

In the case of transmission signal TxD of FIG. 3A, a change of state from a first bus state 401 to a second bus state 402 and then back to first bus state 401 takes place over time t with three successive bits. First bus state 401 may also be referred to as a recessive state or higher level. Second bus state 402 may also be referred to as a dominant state or lower level. As a result of transmission signal TxD of FIG. 3A, voltage V for signals CAN_H and CAN_L is set according to FIG. 4A, differential voltage VDIFF=CAN_H−CAN_L is set according to FIG. 5A, an output signal R 1 of receiver 122 is set according to FIG. 6A, and a receive signal RxD is set according to FIG. 7A. Voltage V for signals CAN_H and CAN_L according to FIG. 4A corresponds in first bus state 401 or recessive state to half the bus bias voltage potential of bus bias voltage unit 1223.

By comparison, the chronological profile of signals in a transmitting/receiving unit according to a conventional transmitting/receiving unit such as, for example, transmitting/receiving unit 13 of user station 20, are illustrated in FIG. 3B through FIG. 7B.

Figure 4A:
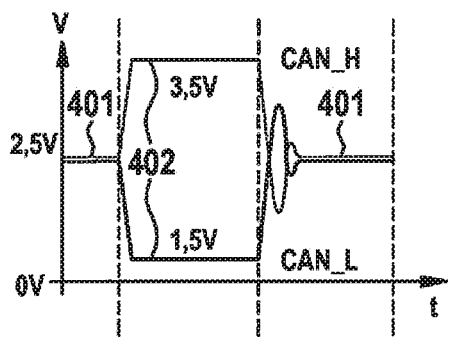
FIG. 4A shows a chronological profile of the bus signals CAN_H and CAN_L in the transmitting/receiving unit including the oscillation reduction unit according to the first exemplary embodiment.
Figure 5A:
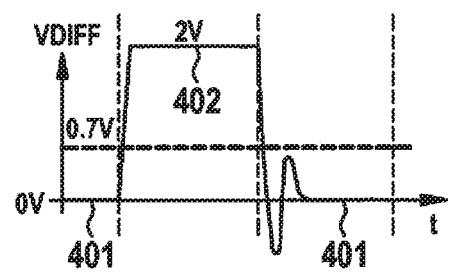
FIG. 5A shows a chronological profile of a differential voltage VDIFF of the bus signals CAN_H and CAN_L in the transmitting/receiving unit including the oscillation reduction unit according to the first exemplary embodiment.
Figure 6A:
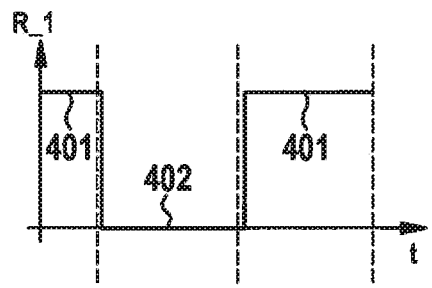
FIG. 6A shows a chronological profile of a receiver output in the transmitting/receiving unit including the oscillation reduction unit according to the first exemplary embodiment.
Figure 7A:
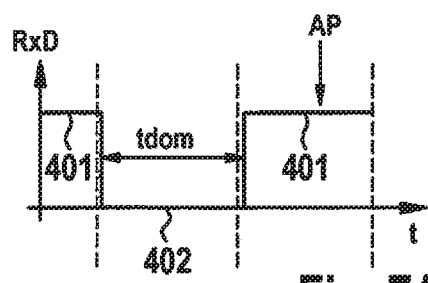
FIG. 7A shows a chronological profile of a receive signal RxD in the transmitting/receiving unit including the oscillation reduction unit according to the first exemplary embodiment.

From the comparison of the signals of FIG. 4A and FIG. 4B, it is very clear that with the same transmission signal TxD, transmitting/receiving unit 12 according to the present exemplary embodiment causes a clearly faster transient oscillation of signals CAN_H and CAN_L after the change of state from state 401 to state 402 or from dominant to recessive. If the threshold voltage of receiver 122 is set to the usual value of 0.7 V, as illustrated in FIG. 5A and FIG. 5B, receiver 122 also no longer recognizes any alleged change of state from state 402 to state 401 or from recessive to dominant, as is also depicted in FIG. 6A, even in the case of a change of state from state 401 to state 402 or from dominant to recessive. Thus, a scanning of receive signal RxD at the presently typical scan point AP may reliably lead to the desired result as depicted in FIG. 7A. This is true even if the length of the bit time tdom of state 401 or of a dominant bit is extended somewhat relative to a conventional transmitting/receiving unit or of transmitting/receiving unit 13 of user station 20, as is apparent from the comparison of FIG. 7A and FIG. 7B.

Thus, transmitting/receiving unit 12 according to the present exemplary embodiment has a lesser tendency to oscillate than a conventional transmitting/receiving unit or transmitting/receiving unit 13.

During the operation of transmitting/receiving unit 12 of FIG. 2, a change of bus state 401 to 402 or from dominant to recessive is recognized by change of state detection block 141 if in the case of the TxD signal a recessive state or state 401 starts at least for the time of one bit, as illustrated in FIG. 3A. As a result, oscillation reduction unit 15 is activated as described below.

Figure 8:
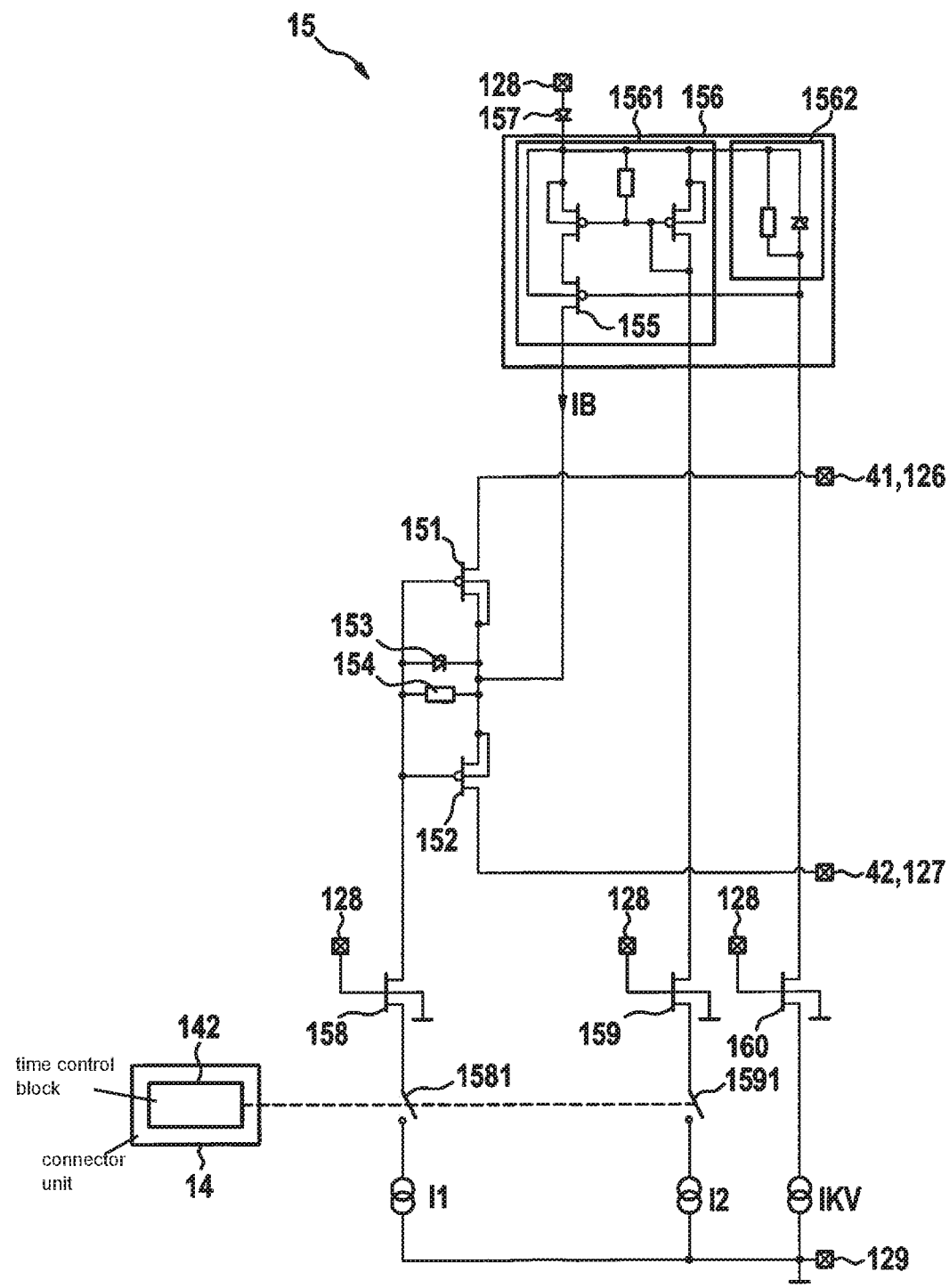
FIG. 8 shows an electrical circuit diagram of the oscillation reduction unit according to the first exemplary embodiment.

According to FIG. 8, oscillation reduction unit 15 includes two PMOS high-voltage transistors 151, 152, which are situated anti-serially and are connectable between bus wires 41, 42. For this purpose, PMOS high-voltage transistor 151 is connected with its drain connection to bus wire 41 for CAN_H. PMOS high-voltage transistor 152 is connected with its drain connection to bus wire 42 for CAN_L. PMOS high-voltage transistors 151, 152 are structured in accordance with the p-substrate bulk technology, which is the conventional or classic design of PMOS high-voltage transistors.

Oscillation reduction unit 15 also includes a Zener diode 153, a resistor 154, a high-voltage cascode transistor 155, which is preferably a high-voltage PMOS cascode, a circuit 156 including transistor 155, a current mirror 1561 and a parallel circuit 1562 made up of a resistor and an additional Zener diode, a polarity reversal protection diode 157, and high-voltage cascode transistors 158, 159, 160, each of which is preferably a high-voltage NMOS cascode. High-voltage cascode 158 is connected to a switch 1581, which is connectable to an inrush current power source I1. High-voltage cascode 159 is connected to a switch 1591, which is connectable to an inrush current power source I2. High-voltage cascode 160 is connected to a power source IKV, which is used to generate a p-cascode bias voltage for high-voltage cascode 155. A switch may optionally also be provided between power source IKV and terminal 129, as in the case of power sources I1 and I2, which is connectable together with switches 1581, 1591.

Zener diode 153 and resistor 154 are connected in parallel. The parallel circuit made up of Zener diode 153 and resistor 154 is connected between the gate terminals of the two PMOS high-voltage transistors 151, 152 and the source terminals of the two PMOS high-voltage transistors 151, 152.

The two PMOS transistors 151, 152 are switched on by time control block 142 during a switch operation from dominant to recessive or during a switch operation from second bus state 402 to first bus state 401. For this purpose, time control block 142 switches switches 1581, 1591 from the opened position, which is shown in FIG. 8, into their closed position. In this way, high-voltage cascode 158 is connected to inrush current power source I1 via switch 1581. High-voltage cascode 159 is also connected to inrush current power source I2 via switch 1591.

After recognizing recessive or first bus state 401, time control block 142 switches switches 1581, 1591 off again or into the opened position shown in FIG. 8. As a result, the connection of high-voltage cascode 158 via switch 1581 to inrush current power source I1 is interrupted. The connection of high-voltage cascode 159 via switch 1591 to inrush current power source I2 is also interrupted.

The time constant made up of resistor 154 and a HV-PMOS gate capacitance of transistors 151, 52 ensures in this case a continuous fading of the short circuit, which is generated by the switching of switches 1581, 1591 during a switching operation from dominant to recessive or a switching operation from second bus state 402 to first bus state 401. This property is also advantageous to the extent that a radiation of oscillation reduction unit 15 and thus also of the components connected thereto is reduced. In this way, hard-wired emissions are reduced.

The circuit of FIG. 8 may be connected monolithically to a CAN FD transceiver front end, as illustrated in FIG. 2 and FIG. 8. However, it is alternatively also possible to construct the circuit of FIG. 8 discretely on a control unit. The control unit may be at least part of a user station 10, 30.

For a reduction or decrease of the radiation, it is also advantageous to compensate for inrush currents I1, I2 to ground with a current IB of plus, more precisely, of the voltage supply of terminal 128. Current IB may also be referred to as a balance current.

Thus, a method for reducing an oscillation tendency when transitioning between different bit states is carried out with the transmitting/receiving unit 12.

In the exemplary embodiment described, only user stations 10, 30 have the functionality of transmitting/receiving unit 12. User stations 10, 30 are preferably user stations or nodes having a high oscillation tendency. The high oscillation tendency of user stations 10, 30 may be a result, in particular, of their position in bus system 1, the position of termination resistors 49, the stub length or stub line length relative to user stations 10, 30, etc.

According to one modification of the first exemplary embodiment, the previously described functionality of transmitting/receiving unit 12 and of oscillation reduction unit 15 is active only if transmitting/receiving unit 12 itself transmits or acts as a transmitter.

According to another modification of the first exemplary embodiment, the previously described functionality of transmitting/receiving unit 12 and of oscillation reduction unit 15 may be active, for example, only in predefined communication phases such as, for example, in the arbitration phases. In arbitration phases, it is determined which of user stations 10, 20, 30 wishes to send the most important message 45, 46, 47 at the time, and therefore obtains as next at least temporarily an exclusive collision-free access to bus 40.

According to still another modification of the first exemplary embodiment, user station 20 also has a transmitting/receiving unit 13, instead of a transmitting/receiving unit 12. In this case, the previously described functionality of transmitting/receiving unit 12 is active for all user stations 10, 20, 30 of the bus system, in particular, as needed.

Figure 9:
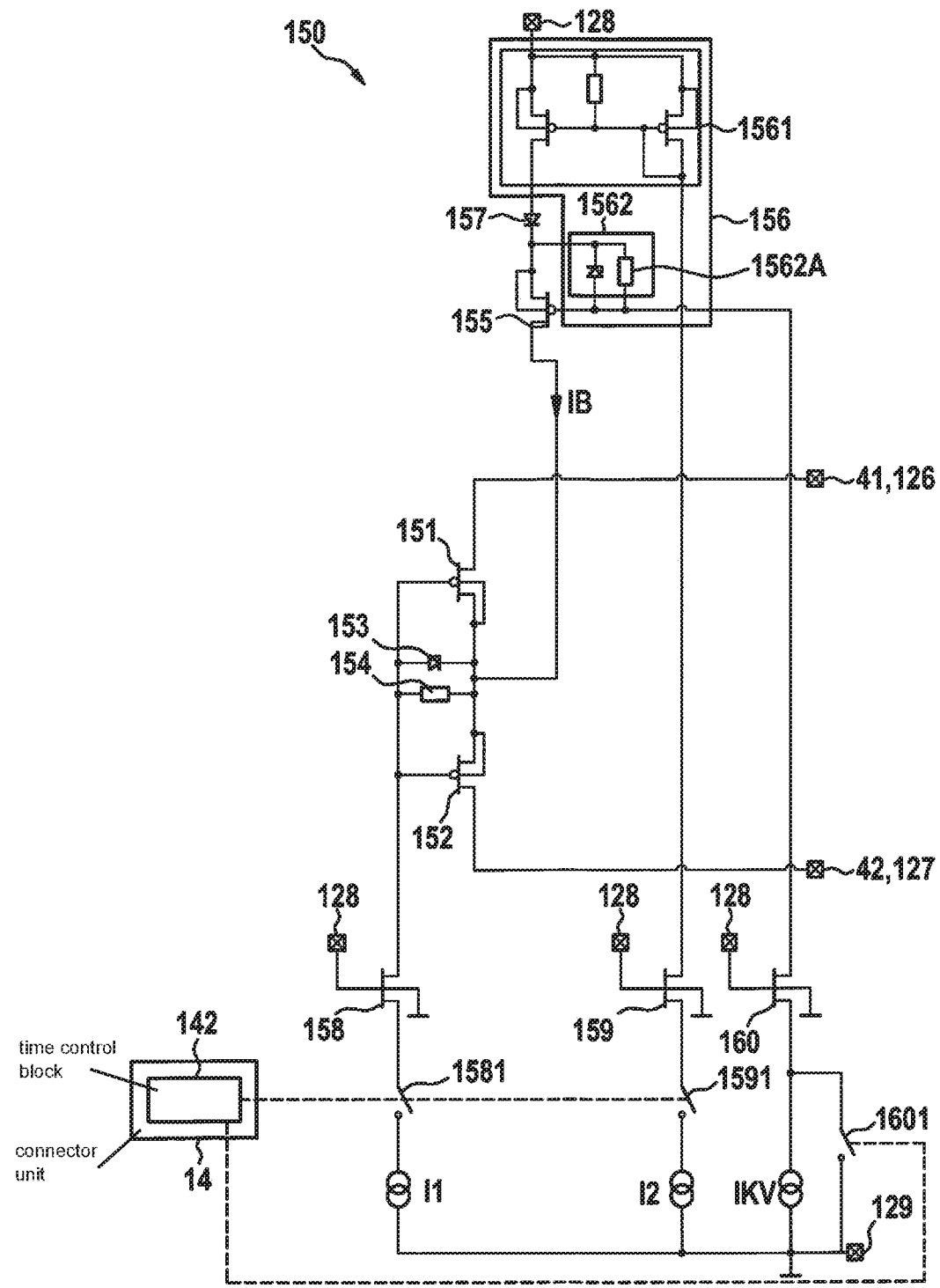
FIG. 9 shows an electrical circuit diagram of an oscillation reduction unit according to a second exemplary embodiment.

FIG. 9 shows an oscillation reduction unit 150 according to a second exemplary embodiment. Bus system 1 and transmitting/receiving unit 12 are structured in the same manner except for the differences described below, as described previously according to the preceding exemplary embodiment or its modifications.

As in the present exemplary embodiment, a switch 1601 is provided in addition to the circuit components, which are described with respect to FIG. 8. Switch 1601 is connected in parallel to power source IKV in FIG. 9. In addition, circuit 156 with current mirror 1561 is modified in such a way that polarity reversal protection diode 157 is provided between current mirror 1561 and the source connection of high-voltage cascode 155. In this case, the anode of polarity reversal protection diode 157 is connected to current mirror 1561. The cathode of polarity reversal protection diode 157 is connected to the source connection and to the gate terminal of high-voltage cascode 155, which is preferably a high-voltage PMOS cascode. In addition, parallel circuit 1562 made up of a resistor 1562A and the additional Zener diode is connected between the source terminal and the gate terminal of high-voltage cascode 155. Resistor 1562A is designed with very high impedance. This means that the resistance value of resistor 1562A is between approximately 3 MΩ to approximately 5 MΩ.

During the operation of the circuit of FIG. 9, switch 1601 is switched by time control block 142 from the opened position, which is shown in FIG. 9, into its closed position, if a dominant state 402 is present or is transmitted in transmission signal TxD. As a result, power source IKV is short circuited. If transmission signal TxD changes from dominant state 402 to recessive state 401, time control block 142 directs closed switch 1601 into the opened position again according to claim 9.

As a result, the p-cascode bias voltage for high-voltage cascode 155, which is generated by power source IKV, is switched off or switched on, respectively.

In this way as well, a method for reducing an oscillation tendency when transitioning between different bit states may be carried out using transmitting/receiving unit 12 and oscillation reduction unit 150.

Figure 10:
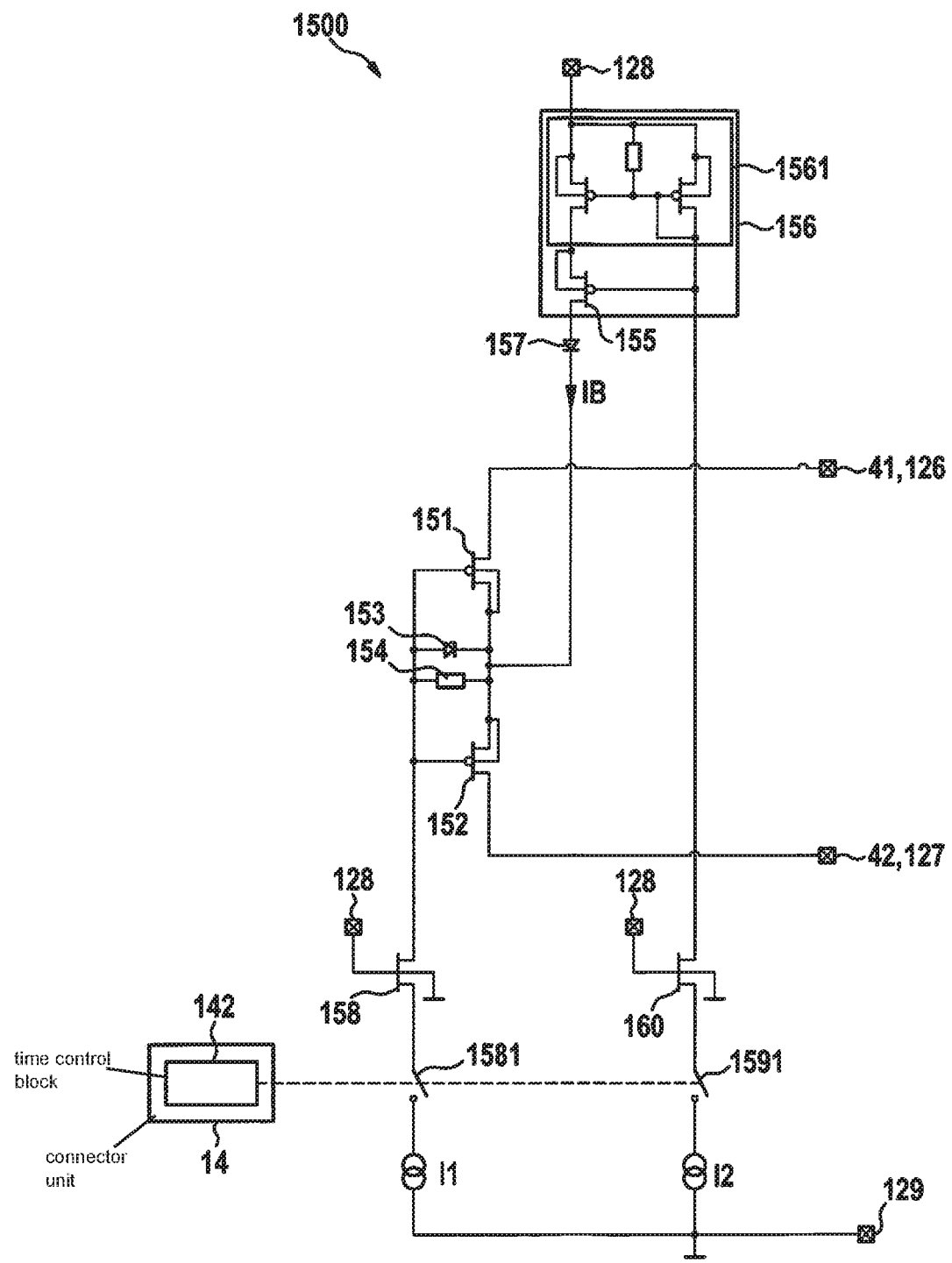
FIG. 10 shows an electrical circuit diagram of an oscillation reduction unit according to a third exemplary embodiment.

FIG. 10 shows an oscillation reduction unit 1500 according to a third exemplary embodiment. Bus system 1 and transmitting/receiving unit 12 are structured in the same manner except for the following described differences, as previously described according to the first exemplary embodiment or its modifications.

In contrast to the preceding exemplary embodiments, in which PMOS high-voltage transistors 151, 152 are structured in accordance with the p-substrate bulk technology, the conventional design of PMOS high-voltage transistors, PMOS high-voltage transistors 151, 152 in oscillation reduction unit 1500 are structured in accordance with a SOI technology (SOI=silicon on insulator). In this case, polarity reversal protection diode 157 is connected downstream from HV cascode 155, as in FIG. 9. As a result, current IKV, which according to the preceding exemplary embodiments is required for generating the p-cascode bias voltage given the p-substrate bulk technology, is also not required in oscillation reduction unit 150.

Figure 11:
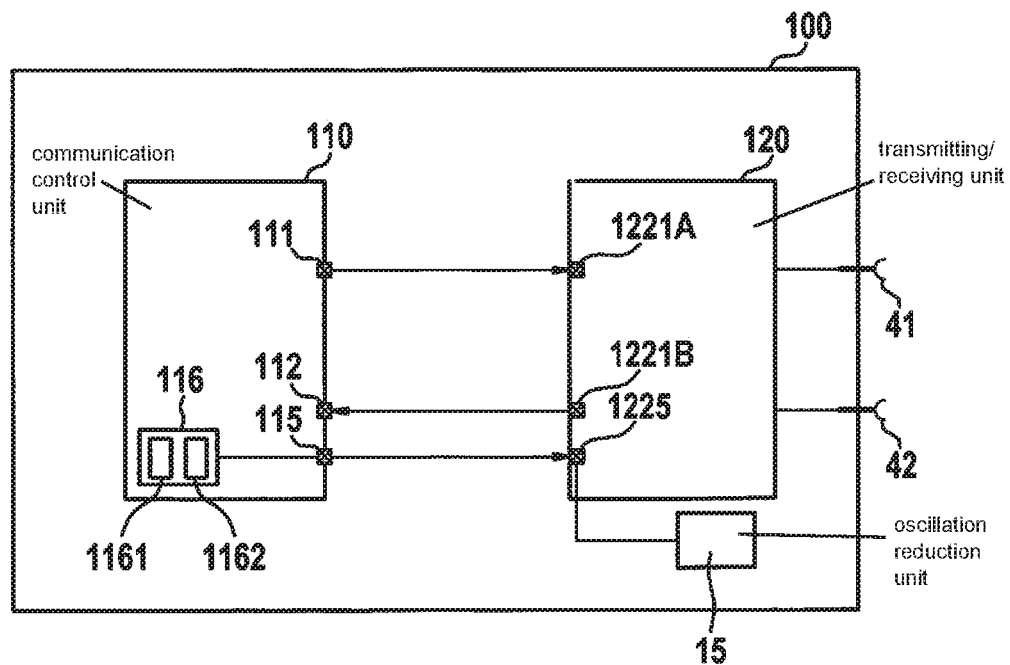
FIG. 11 shows an electrical circuit diagram of a user station of a bus system according to a fourth exemplary embodiment.

FIG. 11 shows the basic structure of a user station 100 including a communication control unit 110 and a transmitting/receiving unit 120 according to a fourth exemplary embodiment, to which an oscillation reduction unit 15 as an example is connected, as described in the first exemplary embodiment. Bus system 1 and user station 100 are structured in the same manner except for the differences described below, as previously described according to the first exemplary embodiment or its modifications for bus system 1 and user station 10.

Communication control unit 110 is structured similarly to communication control unit 11 of the first exemplary embodiment except for the differences described below. Transmitting/receiving unit 120 is structured similarly to transmitting/receiving unit 12 of the first exemplary embodiment, except for the differences described below.

In addition to terminals 111, 112 for signals TxD, RxD, communication control unit 110 has an additional terminal 115 for a control signal RS_Control_Out.

Transmitting/receiving unit 120 has a terminal 1221A for receiving transmission signal TxD from terminal 111 of communication control unit 110, as more generally described previously with respect to the first exemplary embodiment. Transmitting/receiving unit 120 also has a terminal 1221B for transmitting receive signal RxD to terminal 112 of communication control unit 110, as more generally described previously with respect to the first exemplary embodiment. Additionally, transmitting/receiving unit 120 includes a terminal 1225, at which control signal RS_Control_OUT is received as control signal RS_Control_In.

Communication control unit 110 has a control block 116 for generating control signal RS_Control_Out for terminal 115. Control block 116 monitors the bus traffic on bus wires 41, 42 by comparing transmission signal TxD stored as first pieces of information 1161 and receive signal RxD received at terminal 112 and, buffered if needed, with one another. If deviations between the two signals TxD, RxD occur in the recessive bus state, i.e., in first bus state 401, such as, for example, changes of state in receive signal RxD, which were not included in transmission signal TxD, then conclusions may be drawn therefrom about the network or bus 40 and the signal integrity.

In addition, second pieces of information 1162, such as bit rate, propagation delay for both switching operations, i.e., in a change of state from first bus state 401 to second bus state 402, are present in control block 116 of communication control unit 110. Pieces of information 1162 may alternatively be held in an additional block not depicted, in particular, a memory.

Instead of a digital signal, the RxD output at terminal 1221B may in this case be the output signal of an analog-digital converter, which represents the differential voltage of receive signal RxD.

Taking into account these pieces of information 1161, 1162, control block 116 generates control signal RS_Control_Out, which is output by terminal 115, is received at terminal 1225 of transmitting/receiving unit 120 and is relayed to oscillation reduction unit 15. Accordingly, block 14 of the preceding exemplary embodiments may be omitted in transmitting/receiving unit 120.

In this way, the control of the reduction of the oscillation tendency (ringing suppression) is not controlled here by transmitting/receiving unit 120, but by communication control unit 110. In the process, communication control unit 110, more precisely, its control block 116, is able to adapt oscillation reduction unit 15 to the specific properties of user station 100 and of the network or of bus 40. In other words, communication control unit 110, more precisely its control block 116, is able to adjust oscillation reduction unit 15 to be node-and-network-sensitive. Control block 116 thus offers a learning function for user station 100.

In this way, a significant reduction of the oscillation tendency in the change of state from second bus state 402 to first bus state 401 may also be implemented. In addition, a significant gain for bus system 1 as a total system may be achieved as a result.

All previously described embodiments of oscillation reduction units 15, 150, 1500 of transmitting/receiving units 12, 120, of user stations 10, 20, 30, 100 of bus system 1 and of the method carried out therein according to the exemplary embodiments and their modifications may be used individually or in all possible combinations. The following modifications, in particular, are also possible.

Previously described bus system 1 according to the exemplary embodiments and/or their modifications is described with reference to a bus system based on the CAN protocol. Bus system 1 according to the exemplary embodiments and/or their modifications may, however, also be a different type of communication network. It is advantageous, but not necessarily a prerequisite, that in bus system 1, an exclusive collision-free access of a user station 10, 20, 30, 100 to bus 40 or to a shared channel of bus 40 is ensured at least for particular periods of time.

Bus system 1 according to the exemplary embodiments and/or their modifications is, in particular, a CAN network or a CAN HS network or a CAN FD network or a FlexRay network. Bus system 1 may, however, also be another serial communication network.

Oscillation reduction unit 15, 150 may, in particular, be used in LVDS (low voltage differential signaling), which is an interface standard for a high-speed data transmission, in which a transmitter and a receiver are connected to one another via a data transmission path. LVDS is standardized according to ANSI/TIA/EIA-644-1995.

The number and arrangement of user stations 10, 20, 30, 100 in bus system 1 according to the exemplary embodiments and/or their modifications is arbitrary. In particular, only user station 10 or user station 30 or user station 100 may be present in bus systems 1 of the exemplary embodiments and/or of their modifications.

The functionality of the previously described exemplary embodiments and/or of their modifications may be implemented in each case in a transceiver or transmitting/receiving unit 12 or transceiver or in a CAN transceiver or in a transceiver chip set or in a CAN transceiver chip set, etc. In addition or alternatively, it may be integrated into existing products. It is possible, in particular, that the functionality considered is either implemented in the transceiver as a separate electronic component (chip) or is embedded in an integrated overall approach, in which only one electronic component (chip) is present.

What is claimed is:

1. An oscillation reduction unit for a bus system, comprising:
    two transistors situated anti-serially between a first bus wire of a bus of the bus system and a second bus wire of the bus, wherein, in the bus system, an exclusive, collision-free access of a user station to the bus of the bus system is at least temporarily ensured;
    a resistor connected between gate terminals and source terminals of the two transistors; and
    a time control block configured to switch the two transistors, the time control block being configured to switch on the two transistors while a signal on the first and/or second bus wire and/or a transmission signal, from which the signals on the first and/or second bus wire are generated, changes from a dominant state to a recessive state, and the time control block configured to switch off the two transistors if the signal on the first and/or second bus wire and/or the transmission signal is switched into the recessive state.

2. The oscillation reduction unit as recited in claim 1, wherein the oscillation reduction unit is configured to compensate for an inrush current to ground when switching on the transistors with a current from a terminal for a voltage supply.

3. The oscillation reduction unit as recited in claim 1, wherein the two transistors are PMOS high-voltage cascodes.

4. The oscillation reduction unit as recited in claim 1, further comprising:
    an additional transistor, a drain connection of the additional transistor being connected to source terminals of the two transistors connected anti-serially between the first and second bus wires.

5. The oscillation reduction unit as recited in claim 4, further comprising:
    a power source configured to generate a bias voltage for the additional transistor, the additional transistor being structured in accordance with p-substrate bulk technology.

6. The oscillation reduction unit as recited in claim 4, wherein the additional transistor is structured in accordance with silicon on insulator (SOI) technology.

7. A user station for a bus system, comprising:
    a communication control unit configured to control a communication of the user station with at least one additional user station of the bus system;
    a transmitting/receiving unit configured to transmit messages to a bus of the bus system and to receive messages from the bus; and
    an oscillation reduction unit including:
        two transistors situated anti-serially between a first bus wire of the bus of the bus system and a second bus wire of the bus, wherein, in the bus system, an exclusive, collision-free access of the user station to the bus of the bus system is at least temporarily ensured,
        a resistor connected between gate terminals and source terminals of the two transistors, and
        a time control block configured to switch the two transistors, the time control block being configured to switch on the two transistors while a signal on the first and/or second bus wire and/or a transmission signal, from which the signals on the first and/or second bus wire are generated, changes from a dominant state to a recessive state, and the time control block configured to switch off the two transistors if the signal on the first and/or second bus wire and/or the transmission signal is switched into the recessive state.

8. The user station for a bus system as recited in claim 7, wherein the communication control unit or the transmitting/receiving unit includes a block which is configured to detect a change of state of a signal received by the bus from the dominant bus state to the recessive bus state, the oscillation reduction unit being configured to switch on and switch off the two transistors connected anti-serially between the bus wires as a function of the detection result of the block.

9. The user station as recited in claim 7, wherein the oscillation reduction unit is configured in such a way that the oscillation reduction unit is activated only if the transmitting/receiving unit transmits a message on the bus.

10. A bus system, comprising:
    a bus; and
    at least two user stations connected to one another via the bus in such a way that they are able to communicate with one another, wherein at least one of the user stations includes:
        a communication control unit configured to control a communication of the at least one of the user stations with at least one additional user station of the bus system;
        a transmitting/receiving unit configured to transmit messages to the bus of and to receive messages from the bus; and
        an oscillation reduction unit including:
            two transistors situated anti-serially between a first bus wire of the bus and a second bus wire of the bus, wherein, in the bus system, an exclusive, collision-free access of the at least one of the user stations to the bus of the bus system is at least temporarily ensured,
            a resistor connected between gate terminals and source terminals of the two transistors, and
            a time control block configured to switch the two transistors, the time control block being configured to switch on the two transistors while a signal on the first and/or second bus wire and/or a transmission signal, from which the signals on the first and/or second bus wire are generated, changes from a dominant state to a recessive state, and the time control block configured to switch off the two transistors if the signal on the first and/or second bus wire and/or the transmission signal is switched into the recessive state.

11. A method for reducing an oscillation tendency when transitioning between different bit states, the method being carried out using an oscillation reduction unit for a bus system, in which an exclusive, collision-free access of a user station to a bus of the bus system is at least temporarily ensured, the oscillation reduction unit including two transistors, which are situated anti-serially between a first bus wire of the and second bus wire of the bus, the method comprising:
- switching on the two transistors using a time control block while a signal on the first and/or second bus wire and/or a transmission signal, from which the signals on the first and/or second bus wire are generated, changes from a dominant state to a recessive state;
- providing a resistor connected between gate terminals and source terminals of the two transistors; and
- switching off the two transistors using the time control block when the signal on the first and/or second bus wire and/or the transmission signal is switched into the recessive state.

12. The oscillation reduction unit as recited in claim 1, wherein the gate terminals of the two transistors are connected to each other.

13. The oscillation reduction unit as recited in claim 1, wherein the source terminals of the two transistors are connected to each other.

14. The oscillation reduction unit as recited in claim 1, further comprising:
- a Zener diode connected between the gate terminals and the source terminals of the two transistors.

15. The oscillation reduction unit as recited in claim 1, further comprising:
- a switch to connect a current source to the gate terminals of the two transistors to turn them on.

16. The oscillation reduction unit as recited in claim 1, further comprising:
- a switch to connect a current source, via a current mirror, to the source terminals of the two transistors.

* * * * *